(12) United States Patent
Chen et al.

(10) Patent No.: US 11,433,439 B2
(45) Date of Patent: Sep. 6, 2022

(54) INTELLIGENT ROBOT FOR CLEANING AND MENDING NET CAGES AND USE METHOD THEREOF

(71) Applicants: Zhejiang Ocean University, Zhejiang (CN); Qingdao University of Science and Technology, Shandong (CN)

(72) Inventors: Lin Chen, Zhejiang (CN); Pan Zhang, Shandong (CN); Junmei Liu, Zhejiang (CN); Huaming Wang, Zhejiang (CN); Guorong Wu, Zhejiang (CN)

(73) Assignees: Zhejiang Ocean University, Zhoushan (CN); Qingdao University of Science and Technology, Qingdao (CN)

( * ) Notice: Subject to any disclaimer, the term of this patent is extended or adjusted under 35 U.S.C. 154(b) by 301 days.

(21) Appl. No.: 16/869,544

(22) Filed: May 7, 2020

(65) Prior Publication Data
US 2020/0353516 A1    Nov. 12, 2020

(30) Foreign Application Priority Data

May 8, 2019  (CN) .......................... 201910379748.X

(51) Int. Cl.
*B08B 13/00*    (2006.01)
*B63C 11/52*    (2006.01)
(Continued)

(52) U.S. Cl.
CPC ................ *B08B 9/36* (2013.01); *A46B 13/02* (2013.01); *B08B 13/00* (2013.01); *B29C 73/04* (2013.01);
(Continued)

(58) Field of Classification Search
CPC ....... E04H 4/1654; A01K 61/00; B63B 59/08; B63C 11/52
See application file for complete search history.

(56) References Cited

U.S. PATENT DOCUMENTS

| | | | | |
|---|---|---|---|---|
| 2004/0025269 | A1* | 2/2004 | Pichon | ................. E04H 4/1654 15/1.7 |
| 2018/0080307 | A1* | 3/2018 | Outa | ....................... B08B 9/023 |
| 2019/0106897 | A1* | 4/2019 | Ben Dov | .............. E04H 4/1654 |

FOREIGN PATENT DOCUMENTS

| | | |
|---|---|---|
| CN | 203652095 U | 6/2014 |
| CN | 203775937 U | 8/2014 |

(Continued)

*Primary Examiner* — Randall E Chin

(57) ABSTRACT

This application provides an intelligent robot for cleaning and mending a net cage and a method of using the intelligent robot, including: a control system, a main body, an attraction module, a motion module, a cleaning module and a mending module. The main body includes a streamlined pressure casing, and a drive mechanism and a water ballast tank which are located in the pressure casing. The attraction module includes electromagnets which are symmetrically provided at a bottom of the pressure casing. The motion module includes first and second motion mechanisms which are symmetrically provided at opposite sides of the pressure casing. A traveling path of the first motion mechanisms is perpendicular to a traveling path of the second motion mechanisms. The intelligent robot achieves cleaning and mending for both sides of the net cage, and is simple to operate, safe, high-efficient, economical and convenient.

10 Claims, 3 Drawing Sheets

(51) Int. Cl.
 *B08B 9/36* (2006.01)
 *A46B 13/02* (2006.01)
 *B29C 73/04* (2006.01)
 *B29L 28/00* (2006.01)

(52) U.S. Cl.
 CPC ....... *B63C 11/52* (2013.01); *A46B 2200/3006* (2013.01); *B29L 2028/00* (2013.01)

(56) References Cited

FOREIGN PATENT DOCUMENTS

CN 107309866 A 11/2017
NO 20171953 A1 12/2017

* cited by examiner

INTELLIGENT ROBOT FOR CLEANING AND MENDING NET CAGES AND USE METHOD THEREOF

CROSS-REFERENCE TO RELATED APPLICATION

This application claims the benefit of priority from Chinese Patent Application No. 201910379748.X, filed on May 8, 2019. The content of the aforementioned application, including any intervening amendments thereto, is incorporated herein by reference in its entirety.

TECHNICAL FIELD

This application relates to autonomous underwater devices, and more particularly to an intelligent robot for cleaning and mending a net cage.

BACKGROUND OF THE INVENTION

Currently, there are many methods for removing the attachments on net cages, such as manual cleaning, sunshine exposure, mechanical cleaning, caisson method, biological removal, drug removal and physical removal. However, when damages are observed on a net cage during working, it is time-consuming, labor-intensive and not conductive to the growing of aquatic products in the net cage to salvage the net cage ashore and to sew it on land; and it is difficult and costly to manually repair the net cage under water.

Chinese Patent Application Publication No. 107309866 A discloses a robot driven by parallel cables for cleaning net cages in deep sea and a cleaning method using the same; the robot includes a terminal cleaning mechanism, a motion controller and at least two parallel limbs of flexible rope distributed evenly on the net cage, where the terminal cleaning mechanism is located in the net cage; the parallel limbs of flexible rope are connected between the net cage and the terminal cleaning mechanism; each of the parallel limbs of flexible rope includes a wound motor fixed on the net cage and a drive cable; the wound motor connects the drive cable to the terminal cleaning mechanism; and the motor controller controls a coordinating motion of at least two parallel limbs of flexible rope to achieve a three-dimensional underwater motion of the terminal cleaning mechanism in the net cage. The above device achieves the three-dimensional underwater motion of the terminal cleaning mechanism through the parallel driving, which can improve the underwater stability of the device to a certain extent, but still contributes little to the improvement of the positioning accuracy. Chinese Patent CN 203775937 discloses a device for mending net cages, including a grip, a support rod, a foot stand, a sleeve, a hydraulic arm, an anti-fall ring, an ejector rod, a mending hook, a spring, a lamp, a camera, an agraffe and a locking ring; the supporting rod is a circular rod and is sheathed in the sleeve; the sleeve is provided on the foot stand; the anti-fall ring is oval and is fixed below the foot stand; the grip is provided at a rear end of the support rod for manual operation; the camera and the lamp is provided at the foremost end of the support rod for the convenience of maintenance; the hydraulic arm is respectively provided at front ends of left and right sides of the support rod; the ejector rod is respectively provided at inner sides of the hydraulic arms; the mending hook is provided between two ejector rods; the agraffe and the locking ring on the mending hook can interlock with each other; the spring is provided at a gap of hydraulic arms; and after the ejector rods are released, the spring forces the hydraulic arms to rebound to form an initial angle, thereby facilitating a next mending process. However, the above-mentioned devices and methods still fail to clean and mend the net cages at the same time in a safe, high-efficient, economical and convenient way.

SUMMARY OF THE INVENTION

An object of the invention is to provide an intelligent robot for cleaning and mending a net cage, which is easy to operate, safe, high-efficient, economical and convenient.

To achieve the above object, the invention adopts the following technical solutions.

The invention provides an intelligent robot for cleaning and mending a net cage, comprising:
a control system; and
a main body controlled by the control system;
wherein the main body comprises an attraction module, a motion module, a cleaning module and a mending module;
the main body comprises a pressure casing which is streamlined, and a drive mechanism and a water ballast tank which are located in the pressure casing;
the attraction module comprises a plurality of electromagnets which are symmetrically arranged at a bottom of the pressure casing;
the motion module comprises a plurality of first motion mechanisms and a plurality of second motion mechanisms which are symmetrically provided at opposite sides of the pressure casing; a traveling path of the second motion mechanisms is perpendicular to that of the first motion mechanisms; each of the second motion mechanisms is connected with a hinge folding mechanism; the first and second motion mechanisms comprise a plurality of synchronizing wheels connected to the drive mechanism;
the cleaning module comprises a plurality of brushes which are stretchable and provided at the other opposite sides of the pressure casing; each of the brushes is provided with a stretchable rod, and the stretchable rod is connected to the drive mechanism;
the pressure casing is further provided with a searchlight, a camera and a sonar sensor; and
the mending module is provided at a bottom of the main body, and comprises a plurality of mending blocks and a storage device which is configured to store and launch the mending blocks; and the storage device is connected to the drive mechanism.

In the invention, the above-mentioned intelligent robot should be used in pairs. Two intelligent robots are placed slowly at inner and outer sides of the net cage, respectively. The two intelligent robots are correlated to each other through sonar sensors to result in a driving robot and a driven robot, and the control system controls the operation of the drive system so as to control the movement of the synchronizing wheels, so that the two intelligent robots are synchronized. A control system on an aquaculture skiff controls the two intelligent robots based on the attraction module and the motion module to conveniently achieve mending and cleaning for the net cage, and self cleaning of the cleaning module in sequence. During the operation, the aquaculture skiff moves with the two intelligent robots. When the mending and cleaning are completed, the two intelligent robots are withdrawn by automatically adjusting ballast water in the water ballast tank to float. The ballast water in the water ballast tank is adjusted by air compression to suspend the intelligent robot in water, avoiding the damage for the net cage caused by sinking or floating of the intelligent robot. The mending of the net cage comprises a discovering and a mending of a breakage. In a certainly muddy water, the breakage on the net cage is observed using the searchlight and the camera on the pressure casing. Through the cooperation of the motion module and the attraction module, the two intelligent robots are moved to the breakage at the same time, and corresponding mending blocks are launched to mend the breakage. Similarly, through the cooperation of the motion module and the attraction module, the brushes in the cleaning module achieve a targeted cleaning of mussels and water plants on the net cage.

In some embodiments, the brushes are provided at the other opposite sides of the pressure casing, and adjacent brushes rotate in an opposite direction. On one hand, an odd number of brushes are provided respectively, so that it is convenient to stretch the brushes, and a storage space for the brushes in the pressure casing is saved; on the other hand, the adjacent brushes rotate in an opposite direction to ensure the stability of the invention during the cleaning process.

In some embodiments, the cleaning module is further provided with a plurality of circular holes on the pressure casing, and a diameter of the circular holes is slightly larger than an outer diameter of the brushes. An annular self-cleaning device which is comb-shaped is correspondingly provided on each of the circular holes, so that each of the brushes contacts the annular self-cleaning device during stretching to remove dirt on each of the brushes. The dirt is kept out of the main body to achieve the self cleaning of the brushes.

In some embodiments, the motion module is provided with a plurality of waterjet propellers arranged at sides of the pressure casing; wherein when the intelligent robot is moved to a certain position by the water ballast tank, the waterjet propellers are used to finely adjust the position.

In some embodiments, grooves are provided on a surface of the flexible track and are configured to increase a frictional force.

In some embodiments, the mending blocks are mending blocks with pins or mending blocks with pin-holes; wherein when the breakage is found on the net cage, the two intelligent robots respectively at the inner and outer sides of the net cage launch two corresponding mending blocks at the same time; one mending block is a mending block with pins, and the other mending block is a mending block with pinholes, so that the two mending blocks are connected through the connection of pins and pinholes to mend the breakage on the net cage; when the breakage to be mended is large, several mending blocks are employed to carry out the mending.

In some embodiments, a servo motor is used as the drive mechanism; and compared with general motors, the servo motor has a wide range of speed regulation, i.e. a rotation speed of the servo motor is continually adjusted within a wide range while a control voltage is changed; a rotor of the servo motor has a small inertance, a quick response and a sensitive reaction corresponding to the change of the control voltage, i.e. a rapid start and stop is achieved; and the servo motor has a small control power, a good overload capacity and a high reliability.

Compared with the prior art, the invention has the following beneficial effects.

In the invention, the above-mentioned intelligent robot is used in pairs. Two intelligent robots are slowly placed at inner and outer sides of the net cage, respectively. The two intelligent robots are correlated to each other through sonar sensors to obtain a driving robot and a driven robot, and the control system controls the operation of the drive system so as to control the movement of the synchronizing wheels, so that the movement of the two intelligent robots are synchronized. The control system on the aquaculture skiff controls the two intelligent robots based on the attraction module and the motion module to move on the net cage and allow the brushes of the two intelligent robots to rotate symmetrically to conveniently achieve mending and cleaning for the net cage, and self cleaning of the cleaning module, which ensures the safety of operators and improves the work efficiency.

Figure 1:
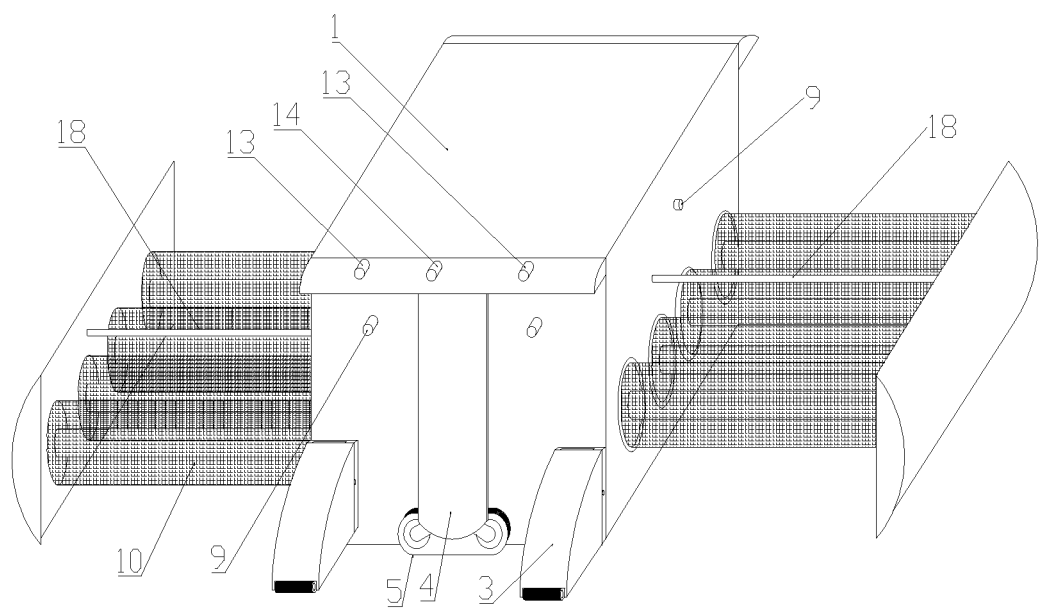
FIG. 1 is a schematic diagram of an intelligent robot for cleaning and mending a net cage according to the present invention.

In the drawings, 1—pressure casing, 2—electromagnet, 3—first motion mechanism, 4—second motion mechanism, 5—synchronizing wheel, 6—flexible track, 7—hinge folding mechanism, 8—sonar sensor, 9—waterjet propeller, 10—brush, 11—circular hole, 12—annular self-cleaning device, 13—searchlight, 14—camera, 15—storage device; 16—mending block with pins, 17—mending block with pinholes, 18—stretchable rod, 19—grooves.

DETAILED DESCRIPTION OF EMBODIMENTS

The invention will be described in detail with reference to the following embodiments.

Embodiment 1

Figure 2:
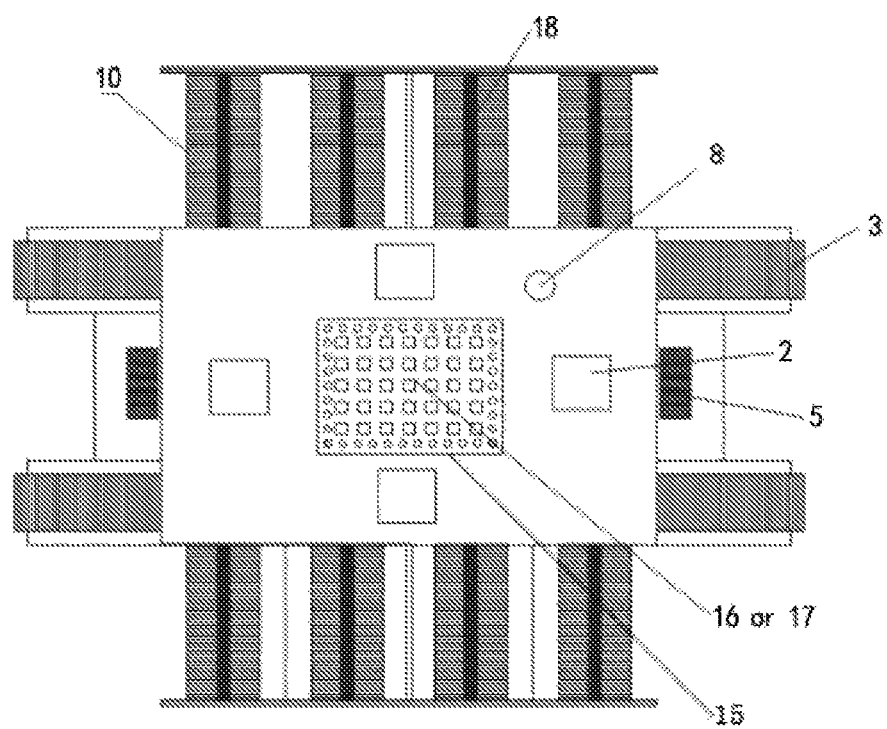
FIG. 2 is a bottom view of the intelligent robot for cleaning and mending the net cage according to the present invention.
Figure 3:
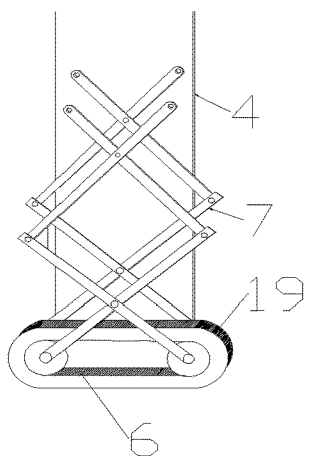
FIG. 3 is a schematic diagram of a second motion mechanism according to the present invention.

As shown in FIGS. 1-2, the invention provides an intelligent robot for cleaning and mending a net cage, including a control system and a main body controlled by the control system. The main body includes an attraction module, a motion module, a cleaning module and a mending module. The main body comprises a pressure casing 1 which is streamlined, and a drive mechanism and a water ballast tank which are located in the pressure casing 1. A servo motor is used as the drive mechanism. The attraction module includes a plurality of electromagnets 2 which are symmetrically provided at a bottom of the pressure casing 1. In this embodiment, four electromagnets 2 are symmetrically provided to greatly reduce the magnetic invalidation caused by dislocation of the electromagnets 2, so that the intelligent robot is ensured to operate normally underwater. As shown in FIG. 3, the motion module includes a plurality of first motion mechanisms 3 and a plurality of second motion mechanisms 4 which are symmetrically provided at opposite sides of the pressure casing 1. A traveling path of the second motion mechanisms 4 is perpendicular to a traveling path of the first motion mechanisms 3. As shown in FIG. 3, each of the second motion mechanisms 4 is connected with a hinge folding mechanism 7. The first motion mechanisms 3 and the second motion mechanisms 4 includes a plurality of synchronizing wheels 5 wrapped with a flexible track 6. Grooves 19 are provided on a surface of the flexible track 6 and are configured to increase a frictional force. The synchronizing wheels 5 are also connected to the drive mechanism. The cleaning module includes a plurality of brushes 10 which are stretchable and are provided at the other opposite sides of the pressure casing 1. Each of the brushes 10 is provided with a stretchable rod 18, and the stretchable rod 18 is connected to the drive mechanism. The pressure casing 1 is further provided with a searchlight 13, a camera 14 and a sonar sensor 8. The mending module is provided at a bottom of the main body and includes a plurality of mending blocks and a storage device 15 which is configured to store and launch the mending blocks; and the storage device 15 is connected to the drive mechanism. The motion module is further provided with a plurality of waterjet propellers 9 which are arranged at sides of the pressure casing 1. In this embodiment, four first motion mechanisms 3 are symmetrically provided at opposite sides of the pressure casing 1; one second motion mechanism 4 is respectively provided in a middle of two first motion mechanisms 3 at each of the opposite sides of the pressure casing 1; the drive mechanism connected to the storage device 15 and the stretchable rod 18 of each of the stretchable brushes 10 is a hydraulic drive mechanism.

In the invention, the above-mentioned intelligent robot should be used in pairs. During operating, two intelligent robots are slowly placed at inner and outer sides of the net cage, respectively. The two intelligent robots are correlated to each other through sonar sensors 8 to obtain a driving robot and a driven robot, and the control system controls the operation of the drive system so as to control the movement of the synchronizing wheels 5, so that the two intelligent robots are synchronized. When the intelligent robots are moved to a certain position by the water ballast tank, the waterjet propellers 9 are used to finely adjust the position of the intelligent robots. A control system on an aquaculture skiff controls the two intelligent robots through the attraction module and the motion module to conveniently achieve mending and cleaning of the net cage, and self cleaning of the cleaning module in sequence. During the operation, the aquaculture skiff moves with the two intelligent robots. When the cleaning and amending are completed, the two intelligent robots are withdrawn by automatically adjusting ballast water in the water ballast tank to float. The mending of the net cage includes the discovering and the mending of breakages. In a certainly muddy water, the breakage on the net cage is observed using the searchlight 13 and the camera 14 on the pressure casing 1. Through the cooperation of the motion module and the attraction module, the two intelligent robots are moved to the breakage at the same time, and corresponding mending blocks are launched to mend the breakage, respectively. Similarly, through the cooperation of the motion module and the attraction module, the brushes 10 of the cleaning module achieve a targeted cleaning for mussels and water plants on the net cage.

Embodiment 2

Figure 4:
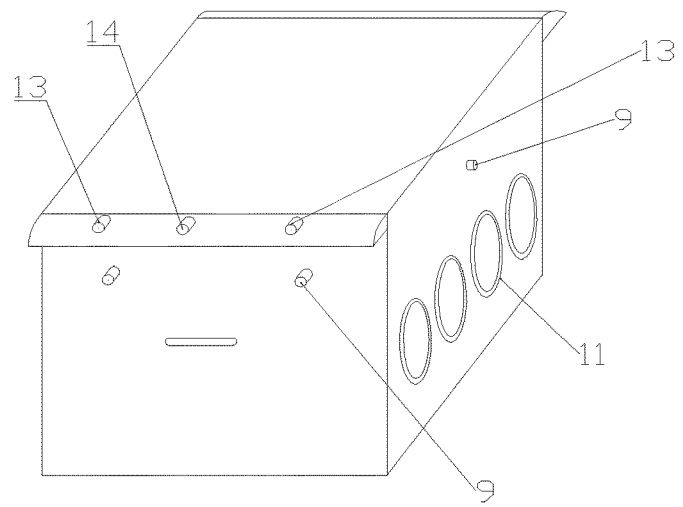
FIG. 4 is a schematic diagram of a main body of the intelligent robot according to the present invention.
Figure 5:
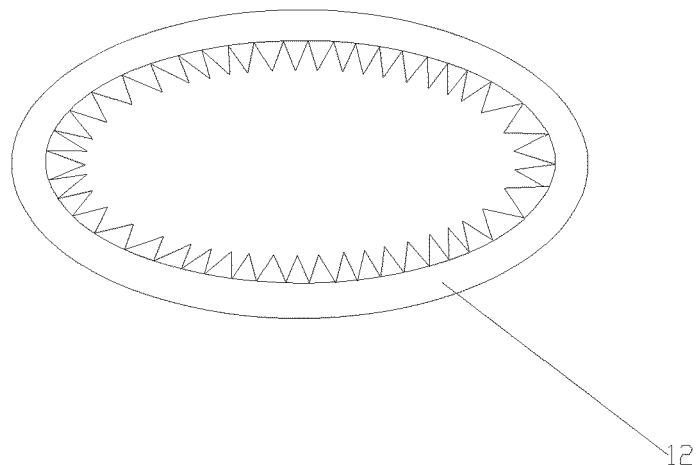
FIG. 5 is a schematic diagram of an annular self-cleaning device according to the present invention.

This embodiment is based on Embodiment 1. The brushes 10 of the cleaning module are provided at the other opposite sides of the pressure casing 1, and adjacent brushes 10 rotate in an opposite direction. As shown in FIGS. 4 and 5, the cleaning module is further provided with a plurality of circular holes 11 arranged on the pressure casing 1, and a diameter of the circular holes 11 is slightly larger than an outer diameter of the brushes 10. A comb-shaped annular self-cleaning device 12 is correspondingly provided on each of the circular holes 11, so that each of the brushes 10 contacts the annular self-cleaning device 12 during the stretching to remove dirt on each of the brushes 10. The dirt is kept out of the main body to achieve the self cleaning of the brushes 10.

Embodiment 3

Figure 6:
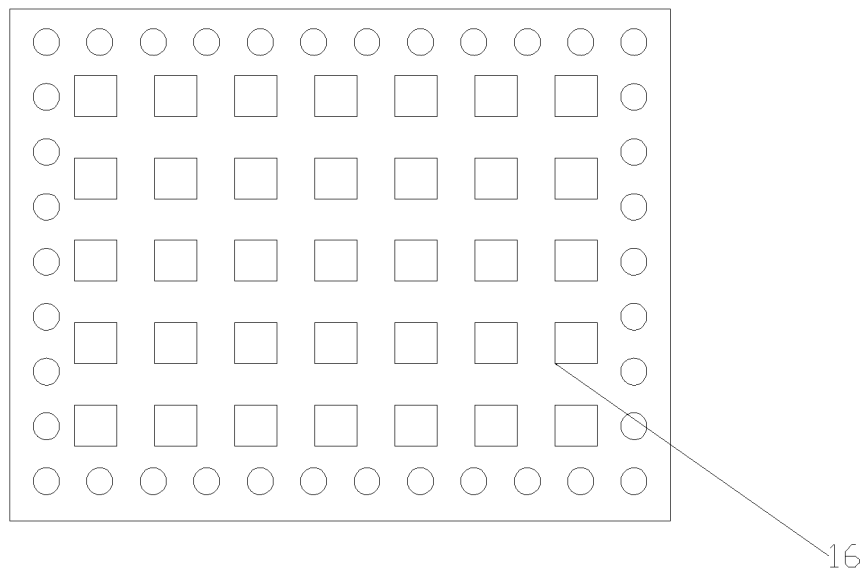
FIG. 6 is a schematic diagram of a mending block with pinholes according to the present invention.
Figure 7:
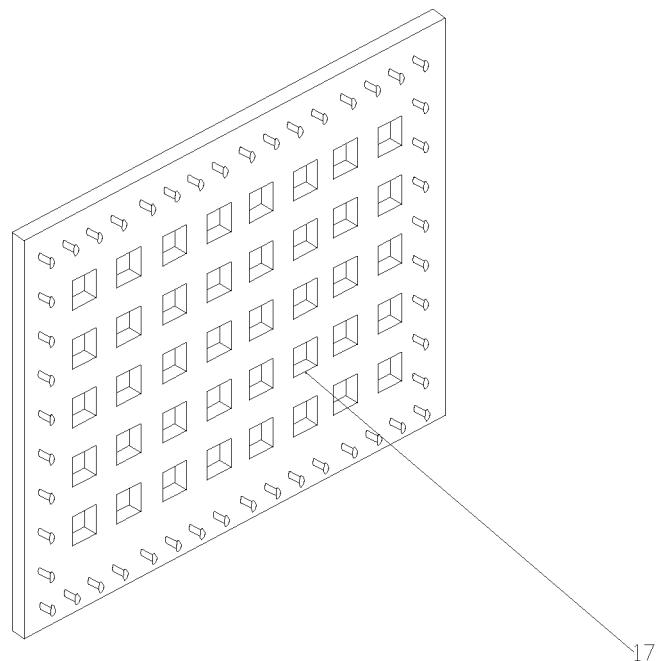
FIG. 7 is a schematic diagram of a mending block with pins according to the present invention.

The intelligent robot of this embodiment is based on Embodiment 2. The mending blocks are mending blocks 16 with pins or mending blocks 17 with pinholes. When broken holes are found on the net cage, the two intelligent robots are located at the inner and outer sides of the net cage launch two corresponding mending blocks at the same time. As shown in FIGS. 6 and 7, one mending block is a mending block 16 with pins, and the other mending block is a mending block 17 with pinholes, so that the two mending blocks are connected through the connection of pins and pinholes to mend the breakage on the net cage. When the breakage to be mended is large, several mending blocks can be employed to carry out the mending.

Embodiment 4

The above-mentioned intelligent robot should be used in pairs; two intelligent robots are respectively placed at inner and outer sides of the net cage. The two intelligent robots are correlated to each other via sonar sensors 8 and attract each other via a magnetic force to clamp the net cage. Each of the two intelligent robots is provided with a set of first motion mechanisms 3 and second motion mechanisms 4. A traveling path of flexible tracks 6 of the first motion mechanisms 3 is perpendicular to that of the second motion mechanisms 4. When the flexible tracks 6 of the first motion mechanisms 3 of the two intelligent robots walk, the brushes 10 rotate to clean surfaces of the net cage; meanwhile, the flexible tracks 6 of the second motion mechanisms 4 of the two intelligent robots are retracted into the pressure casing 1 along a direction perpendicular to the bottom of each of the two intelligent robots through a stretchable device, so that the friction between the second motion mechanisms and the net cage is eliminated. After a round of cleaning on the net cage, the flexible tracks 6 of the second motion mechanisms 4 of the two intelligent robots are extended to abut each other till flexible tracks 3 of the first motion mechanisms 3 separate with each other and fail to clamp the net cage. The two intelligent robots are moved laterally for a width of each of the two intelligent robots, and the flexible tracks 6 of the second motion mechanisms 4 are withdrawn. Then the flexible tracks 6 of the motion mechanisms 3 used in pairs tightly clamp the net cage to start a next round of cleaning.

The ballast water in the water ballast tank is adjusted by air compression to suspend the intelligent robot in water, avoiding to the damage for the net cage caused by sinking or floating of the intelligent robot.

The above-mentioned embodiments are merely preferred embodiments of the invention, which are only illustrative, and are not intended to limit the scope of the invention. Various variations and modifications made by those skilled in the art without departing from the spirit of the invention should fall within the scope of the invention.

What is claimed is:

1. An intelligent robot for cleaning and mending a net cage, comprising:
   a control system; and
   a main body controlled by the control system;
   wherein the main body comprises an attraction module, a motion module, a cleaning module and a mending module;
   the main body comprises a pressure casing which is streamlined, and a drive mechanism and a water ballast tank which are located in the pressure casing;
   the attraction module comprises a plurality of electromagnets which are symmetrically arranged at a bottom of the pressure casing;
   the motion module comprises a plurality of first motion mechanisms and a plurality of second motion mechanisms which are symmetrically provided at opposite sides of the pressure casing; a traveling path of the second motion mechanisms is perpendicular to that of the first motion mechanisms; each of the second motion mechanisms is connected with a hinge folding mechanism; the first and second motion mechanisms comprise a plurality of synchronizing wheels connected to the drive mechanism;
   the cleaning module comprises a plurality of brushes which are stretchable and provided at the other opposite sides of the pressure casing; each of the brushes is provided with a stretchable rod, and the stretchable rod is connected to the drive mechanism;
   the pressure casing is further provided with a searchlight, a camera and a sonar sensor; and
   the mending module is provided at a bottom of the main body, and comprises a plurality of mending blocks and a storage device which is configured to store and launch the mending blocks; and the storage device is connected to the drive mechanism.

2. The intelligent robot of claim 1, wherein the brushes in the cleaning module are respectively provided at the other opposite sides of the pressure casing, and adjacent brushes rotate in an opposite direction.

3. The intelligent robot of claim 2, wherein the cleaning module is further provided with a plurality of circular holes arranged on the pressure casing, and a diameter of the circular holes is slightly larger than an outer diameter of the brushes.

4. The intelligent robot of claim 3, wherein an annular self-cleaning device which is comb-shaped is correspondingly provided on each of the circular holes.

5. The intelligent robot of claim 1, wherein the mending blocks are mending blocks with pins or mending blocks with pinholes.

6. The intelligent robot of claim 1, wherein each of the synchronizing wheels is wrapped with a flexible track.

7. The intelligent robot of claim 6, wherein grooves are provided on a surface of the flexible track and are configured to increase a frictional force.

8. The intelligent robot of claim 7, wherein the flexible track is made from polyurethane.

9. The intelligent robot of claim 1, wherein the motion module is provided with a plurality of waterjet propellers arranged at sides of the pressure casing, and a servo motor is used as the drive mechanism.

10. A method for using the intelligent robot of claim 1, comprising:
   (1) adjusting ballast water in the water ballast tank by air compression to suspend the intelligent robot in water, wherein during a cleaning operation, two intelligent robots are used in pairs; one intelligent robot is arranged at an outer side of the net cage, and the other intelligent robot is arranged at an inner side of the net cage;
   (2) clamping the net cage by correlating the sonar sensors of the two intelligent robots to allow the two intelligent robots to attract each other via a magnetic force, enabling flexible tracks of first motion mechanisms of the two intelligent robots to walk, rotating the brushes to clean a surface of the net cage;
   (3) after the two intelligent robots complete a round of cleaning on the net cage, extending flexible tracks of second motion mechanisms of the two intelligent robots to abut each other till the flexible tracks of the first motion mechanisms separate with each other and fail to clamp the net cage, moving the two intelligent robots laterally for a width of each of the two intelligent robots, retracting the flexible tracks of the second motion mechanisms, and clamping the net cage using the flexible tracks of the first motion mechanisms to start a next round of cleaning;
   (4) when the cleaning is completed or there is dirt on the brushes, retracting the brushes to the annular self-cleaning device to remove the dirt on the brushes;
   (5) seeking a breakage on the net cage by the searchlight and the camera on the pressure casing, moving the two intelligent robots to the breakage at the same time through the cooperation of the motion module and the attraction module; and launching corresponding mending blocks to mend the breakage; and
   (6) after the mending is completed, withdrawing the two intelligent robots by automatically adjusting the ballast water in the water ballast tank to allow the two intelligent robots to float.

* * * * *